United States Patent [19]

Nakayasu

[11] Patent Number: 5,710,775
[45] Date of Patent: Jan. 20, 1998

[54] ERROR ALLOWING PATTERN MATCHING CIRCUIT

[75] Inventor: Kanada Nakayasu, Tokyo, Japan

[73] Assignee: NEC Corporation, Tokyo, Japan

[21] Appl. No.: 404,380

[22] Filed: Mar. 15, 1995

[30] Foreign Application Priority Data

May 18, 1994 [JP] Japan .................... 6-103586

[51] Int. Cl.[6] .................................. G06F 11/00
[52] U.S. Cl. .................. 371/5.1; 371/21.1; 371/67.1
[58] Field of Search ..................... 371/5.1, 21.1, 371/5.2, 25.1, 37.1, 67.1, 41, 48; 375/365; 370/105.1; 348/525; 365/201

[56] References Cited

U.S. PATENT DOCUMENTS

| | | | |
|---|---|---|---|
| 4,686,690 | 8/1987 | Sato | 375/365 |
| 4,747,116 | 5/1988 | Yajima et al. | 375/365 |
| 5,228,036 | 7/1993 | Okamoto et al. | 370/105.1 |
| 5,473,615 | 12/1995 | Boyer et al. | 371/5.1 |

FOREIGN PATENT DOCUMENTS

| | | |
|---|---|---|
| 63-217749 | 9/1988 | Japan . |
| 1-256232 | 10/1989 | Japan . |
| 5-14443 | 1/1993 | Japan . |
| 5-235924 | 1/1993 | Japan . |

*Primary Examiner*—Phung Chung
*Attorney, Agent, or Firm*—Foley & Lardner

[57] ABSTRACT

An error allowing pattern matching circuit comprises a data conversion circuit which converts receive data transmitted serially thereto from an input terminal into parallel data and outputs the parallel data, a ROM to which the parallel data from the data conversion circuit are inputted as an address signal and which outputs the numbers of error bits for four different particular patterns to be detected in response to the address signal, four setting circuits for setting the allowable numbers of error bits for the receive data, and four comparison circuits which individually compare the four sets of error bit numbers outputted from the ROM with the allowable numbers of error bits set by the four setting circuits, each generating the receive data when the error bit number becomes lower than the corresponding allowable number of error bits as a detection pulse.

5 Claims, 2 Drawing Sheets

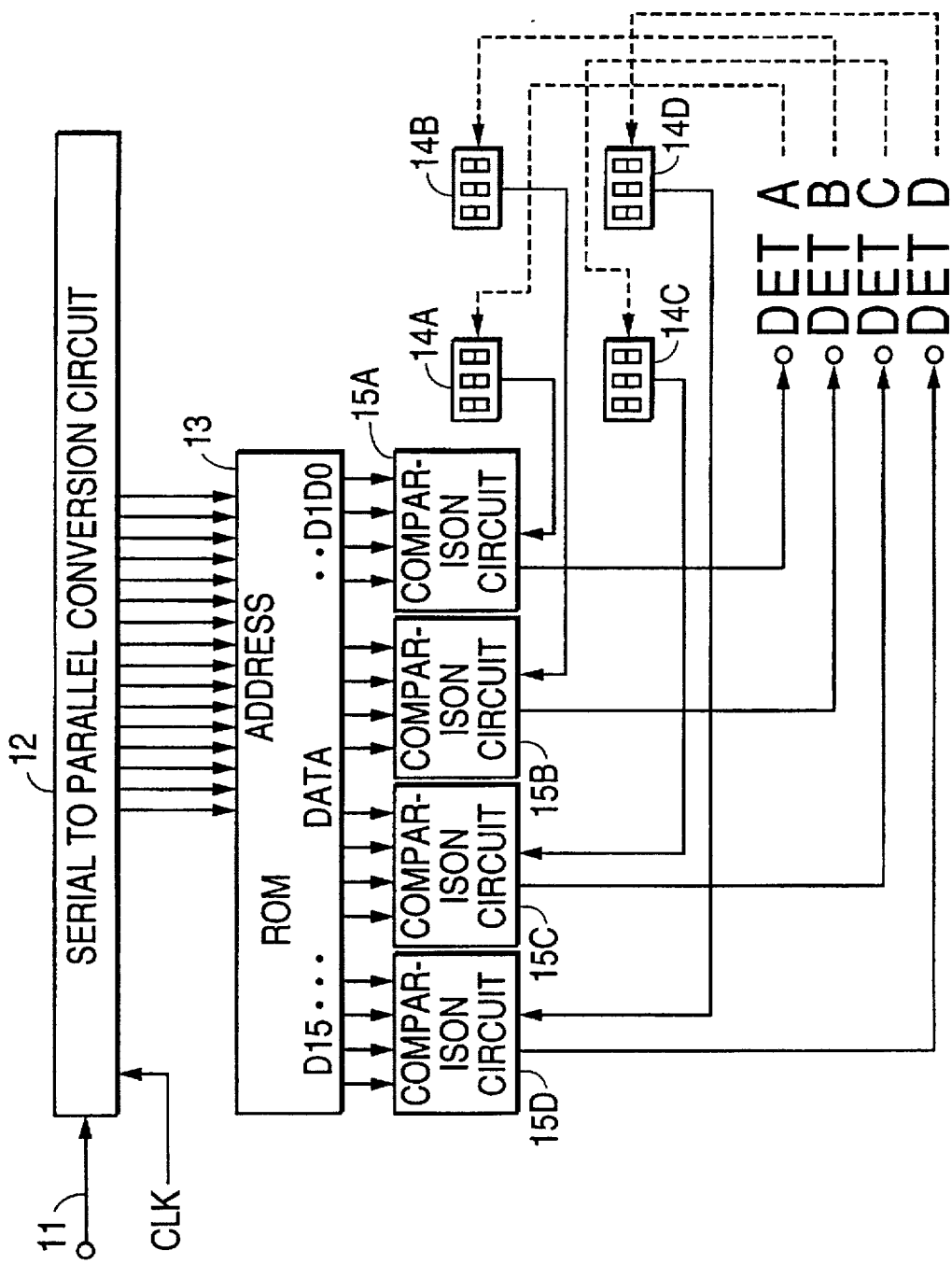

ERROR ALLOWING PATTERN MATCHING CIRCUIT

BACKGROUND OF THE INVENTION

1. Field of the Invention

The present invention relates to a pattern matching circuit for a data transmission line, and more particularly to an error allowing pattern matching circuit which can detect a pattern allowing a certain amount of errors.

2. Description of the Related Art

In the field of data transmission technologies, several methods for detecting a particular pattern from within certain serial data are conventionally known. One of the known methods employs such a pattern matching circuit as disclosed, for example, in Japanese Laid-Open Patent Publication No. 68-217749, which employs a ROM and is simple in circuit configuration and high in mounting efficiency.

The conventional pattern matching circuit includes, as shown in FIG. 1, serial to parallel conversion circuit 2 which converts serial data inputted thereto from input terminal 1 into parallel data and outputs the parallel data, and error bit number addition circuit 3 constituted from a plurality of ROMs 3a to 3n connected at a plurality of stages. Each of the ROMs stores an error bit number corresponding to address data thereto as read data.

Further, the address data lines of each ROM are divided into two groups of high order address data lines and low order address data lines. The high order address data lines of each ROM are connected to the read data lines of the ROM at the preceding stage, and the low order address data lines are connected to parallel data lines of serial to parallel converter 2. ROM 3n at the last stage outputs a result of addition of error bit numbers obtained from the ROMS of all of the stages, and has supervisory information line 5 having output terminal 4 for outputting a pattern detection signal when the result of addition of ROM 3n exhibits a value lower than an allowable number of error bits.

In the conventional pattern matching circuit having the construction described above, serial data inputted from input terminal 1 are converted into parallel data by serial to parallel converter 2. The parallel data are inputted to the low order addresses of the ROMs at the following stages. Meanwhile, a sum of error bit numbers obtained at the preceding ROMs is inputted to the high order address at each ROM. In other words, as address data to each ROM, an error bit number at the preceding stages and parallel data for each stage are inputted. On the other hand, as read data from each ROM, data obtained by adding an error bit number of parallel data at the stage to a total error bit number of parallel data at the preceding stages are outputted.

Further, ROM 3n at the last stage outputs a result of the addition of error bit numbers at all of the stages and outputs a pattern detection signal from output terminal 4 of supervisory Information line 5 when the result of addition is lower than the allowable number of error bits.

The pattern matching circuit of the construction described above can detect, even if data include errors, a pattern allowing a certain amount of errors. Therefore, the pattern matching circuit can be used to detect a particular pattern from within received serial data in order to, for example, establish frame synchronization in digital communications, particularly in mobile communications, in such a circumstance that data including a certain amount of data are inputted to the receive side because of an influence of the communication route. It is to be noted that a bit which does not coincide with a particular bit of a particular pattern to be detected is called "error bit".

However, where a pattern is detected allowing a certain amount of errors as In the conventional pattern matching circuit described above, there is a problem in that the detection rate varies significantly depending upon the setting of the allowable number of error bits (hereinafter referred to as "allowable error number").

For example, if the allowable error number is set to such a low level as 0 to 10% with respect to the number of bits of a pattern to be detected, the predetermined pattern can be detected accurately. However, since the allowable error number is small, the pattern matching circuit does not operate well with data having errors and, when it is used to establish frame synchronization, an out-of-synchronous condition occurs frequently.

On the contrary, if the allowable error number is set to such a high level as 20 to 25% with respect to the number of bits of a pattern to be, detected, an out-of-synchronous condition occurs less frequently indeed. However, also the possibility that a wrong pattern may be detected becomes high.

When the reciprocal problems described above are provided for by setting the allowable error number in this manner, normally a suitable value between the values mentioned above is set and used in accordance with an object of use.

In the conventional pattern matching circuit described above, since a pattern detection signal is generated by way of a supervisory information line which is a direct output of a ROM, if it is tried to vary the allowable error number, then the stored contents of the ROM at the last stage must be thoroughly varied. In other words, once an allowable error number is set, it is difficult to re-set the allowable error number in accordance with the object of use. Accordingly, the conventional pattern matching circuit is disadvantageous in that it is low in universality.

SUMMARY OF THE INVENTION

Accordingly, it is an object of the present invention to provide, in view of the disadvantage of the conventional pattern matching circuit described above, an error allowing pattern matching circuit which is simple in circuit configuration and high in universality and wherein, when a particular pattern is detected from within received data allowing a certain amount of errors, the efficiency in pattern matching can be improved by freely varying the allowable error number in accordance with the situation.

In order to attain the object described above, according to the present invention, there is provided an error allowing pattern matching circuit, comprising:

information storage means for receiving receive data as an address signal thereto and outputting the number of error bits at which the address signal does not coincide with a particular pattern to be detected;

a setting circuit for setting the allowable number of error bits for the receive data; and a comparison circuit for comparing the number of error bits outputted from the information storage means with the allowable number of error bits set by the setting circuit and generating the receive data when the number of error bits becomes lower than the allowable number of error bits as a detection pattern.

Preferably the error allowing pattern matching circuit is constructed such that:

the receive data are outputted from a data conversion circuit which converts serial data transmitted thereto into parallel data; that the numbers of error bits for particular patterns to be detected are stored in advance in the information storage means corresponding to all address signals which may possibly be inputted to the information storage means; that the setting circuit includes a switch which is capable of setting the allowable number of error bits among a plurality of values; or that a feedback loop is constructed so that the detection pattern from the comparison circuit is inputted to the setting circuit, and the setting circuit sets the allowable number of error bits to a low value upon a pull in operation wherein most accurate pattern detection is required, but sets, in an ordinary operation, the allowable number of error bits to a high value in order to prevent an out-of-synchronous condition.

In any case, the error allowing pattern matching circuit may be constructed such that information storage means outputs error bit numbers for a plurality of different particular patterns to be detected in response to a single address signal, and the setting circuit and the comparison circuit are each provided by a plural number corresponding to the error bit numbers for the plurality of different particular patterns to be detected.

In the error allowing pattern matching circuit of the present invention having the construction described above, when receive data are inputted as an address signal to the information storage means, the information storage means outputs the number of error bits at which the receive data do not coincide with a particular pattern to be detected in response to the address signal.

Meanwhile, the allowable number of error bits for the receive data is set by the setting means, and the number of error bits outputted from the information storage means is compared by the comparison circuit with the allowable number of error bits set by the setting circuit. When the number of error bits becomes smaller than the allowable number of error bits as a result of the comparison, the comparison circuit generates the receive data then as a detection pattern.

From this, the allowable number of error bits for the receive data can be set freely in accordance with an object of use by the setting circuit without the necessity of thoroughly varying the stored contents of a ROM or a like element which serves as the information storage means, distinct from the conventional pattern matching circuit. Accordingly, the error allowing pattern matching circuit of the present invention presents high universality.

Further, where the numbers of error bits for particular patterns to be detected are stored in advance in the information storage means corresponding to all address signals which may possibly be inputted to the information storage means, the error allowing pattern matching circuit can be constructed in a simple construction.

Furthermore, where a feedback loop is constructed so that the detection pattern from the comparison circuit is inputted to the setting circuit and the allowable number of error bits is varied freely in accordance with the situation, that is, the allowable number of error bits is set to a low value upon a pull in operation wherein most accurate pattern detection is required but to a high value, in an ordinary operation, in order to prevent an out-of-synchronous condition, establishment of stabilized frame synchronization can be achieved and smooth pattern detection can be achieved.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a block diagram showing an error allowing pattern matching circuit of the present invention.

DETAILED DESCRIPTION OF THE PREFERRED EMBODIMENT

Figure 1:
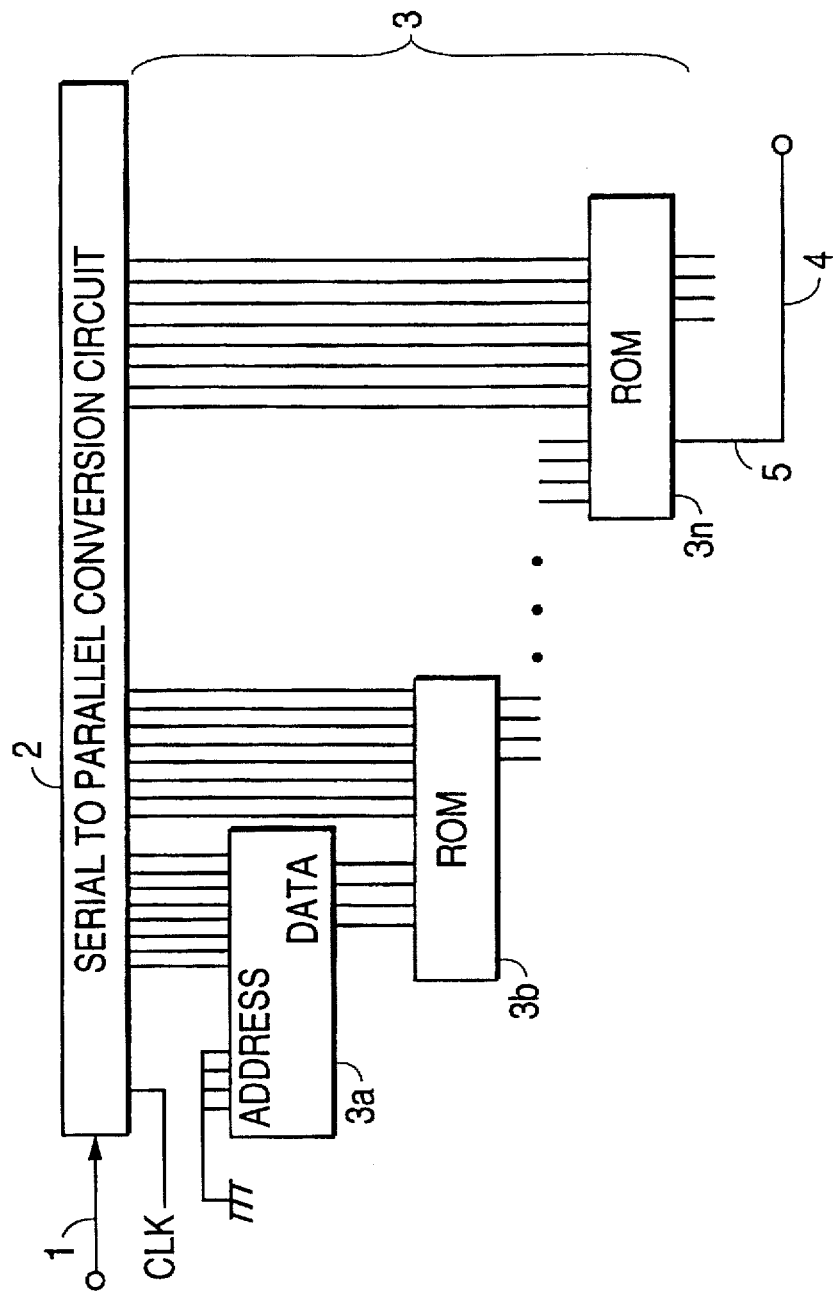
FIG. 1 is a block diagram showing a conventional error allowing pattern matching circuit.

An embodiment of the present invention is described below with reference to the drawings.

The pattern matching circuit of the present embodiment includes, as shown in FIG. 2, serial to parallel conversion circuit 12 for converting serial data inputted thereto from input terminal 11 into parallel data and outputting the parallel data, and a ROM 13 serving as information storage means to which the parallel data outputted from serial to parallel conversion circuit 12 are inputted directly as an address signal. The number of bits of the parallel data outputted from serial to parallel conversion circuit 12 is equal to the number of bits of particular patterns to be detected.

The numbers of error bits when compared with four different particular patterns A to D to be detected are stored in advance in ROM 13 for an address signal inputted to it, and the number of error bits for particular pattern A is outputted to read data D0 to D3; the number of error bits for particular pattern B is outputted to read data D4 to D7; the number of error bits for particular pattern C is outputted to read data D8 to D11; and the number of error bits for particular pattern D is outputted to read data D12 to D15. In short, as outputs of ROM 13, the numbers of error bits for four different particular patterns A to D to be detected are outputted at a time.

Connected to the four sets of output lines from ROM 13 are comparison circuits 15A to 15D for comparing the thus outputted error bit numbers for four particular patterns A to D with allowable numbers of error bits set by setting circuits 14A to 14D, which are hereinafter described, respectively. Each of those comparison circuits 15A to 15D outputs a detection pulse corresponding to the respective particular pattern when the corresponding error bit number outputted from ROM 13 becomes smaller than the allowable error number set by the corresponding setting circuit.

Here, four setting circuits 14A to 14D which can set the allowable numbers of error bits freely are provided for comparison circuits 15A to 15D, respectively, and each of setting circuits 14A to 14D is provided with a setting switch or switches (not shown) which can be manually operated from the outside. As an example, the detection level is divided into three stages, and the allowable error numbers are set, for example, to 6, 4 and 2 for those detection levels 1, 2 and 3. Setting circuits 14A to 14D are provided one by one for the particular patterns to be detected and can individually set allowable error numbers for the four different kinds of patterns.

In the error allowing pattern matching circuit having the construction described above, serial data inputted from input terminal 11 are converted into parallel data by serial to parallel conversion circuit 12 and read in as an address signal for ROM 13. The four sets of output lines from ROM 13 output the error bit numbers for four particular patterns A to D to be detected. Then, comparison circuits 15A to 15D compare the error bit numbers for particular patterns A to D with the allowable error numbers set by setting circuits 14A to 14D, respectively. When the result of any comparison becomes smaller than the corresponding allowable error number, since this signifies that a detection pattern is detected, a detection pulse is generated from a corresponding one of comparison circuits 15A to 15D.

While each allowable error number in the error allowing pattern matching circuit described above is set by an external input from a switch at a setting circuit, the present invention is not limited to this, and when it is intended to establish frame synchronization, it is also possible, for example, to form a feedback loop for a detection pulse in each setting circuit for an allowable error number and set the allowable error number to a low value upon a pull in operation wherein most accurate pattern detection is required but set the allowable error number to a high value during an ordinary operation in order to prevent an out-of-synchronous condition thereby to achieve stabilized frame synchronization.

Further, while a ROM is employed as the information storage means in the circuit, the present invention is not limited to this. An EPROM may be used for the ROM in order to facilitate a variation of a particular pattern to be detected.

As described above, according to the present invention, since the comparison circuit for comparing the number of error bits for a particular pattern to be detected which are read out from information storage means, to which receive data are inputted as an address signal, with the set allowable number of error bits and the setting circuit for setting the allowable number of error bits are constructed independently of the Information storage means, the allowable number of error bits for the receive data can be set freely in accordance with an object of use by the setting circuit without the necessity of thoroughly varying the stored contents of a ROM or a like element, distinct from the conventional pattern matching circuit. As a result, the error allowing pattern matching circuit of the present invention presents high universality.

Further, where the numbers of error bits for particular patterns to be detected are stored in advance in the information storage means corresponding to all address signals which may possibly be inputted to the information storage means, the error allowing pattern matching circuit can be constructed in a simple construction.

Furthermore, where a feedback loop is constructed so that the detection pattern from the comparison circuit Is inputted to the setting circuit and the allowable number of error bits is set to a low value upon a pull in operation wherein most accurate pattern detection is required but to a high value, in an ordinary operation, in order to prevent an out-of-synchronous condition, establishment of stabilized frame synchronization can be achieved and smooth pattern detection can be achieved. As a result, the efficiency in pattern matching is improved.

In addition, where the error bit numbers for a plurality of different particular patterns with respect to a single address signal are stored in the information storage means, a plurality of patterns can be detected in one cycle.

It is to be understood that variations and modifications of the error allowing pattern matching circuit disclosed herein will be evident to those skilled In the art. It is intended that all such modifications and variations be included within the scope of the appended claims.

What is claimed is:

1. An error allowing pattern matching circuit, comprising:

information storage means for receiving receive data as an address signal thereto and outputting the number of error bits at which the address signal does not coincide with a particular pattern to be detected, wherein said information storage means includes only one memory device;

a setting circuit for setting the allowable number of error bits for the receive data; and a comparison circuit for comparing the number of error bits outputted from said information storage means with the allowable number of error bits set by said setting circuit and generating the receive data when the number of error bits becomes lower than the allowable number of error bits as a detection pattern, and wherein a feedback loop is constructed so that the detection pattern from said comparison circuit is inputted to said setting circuit, and said setting circuit sets the allowable number of error bits to a low value upon a pull in operation wherein most accurate pattern detection is required, but sets, in an ordinary operation, the allowable number of error bits to a high value in order to prevent an out-of-synchronous condition.

2. An error allowing pattern matching circuit as claimed in claim 1, wherein the receive data are outputted from a data conversion circuit which converts serial data transmitted thereto into parallel data.

3. An error allowing pattern matching circuit as claimed in claim 1, wherein the numbers of error bits for particular patterns to be detected are stored in advance in said information storage means corresponding to all address signals which may possibly be inputted to said information storage means.

4. An error allowing pattern matching circuit as claimed in claim 1, wherein said setting circuit is capable of setting the allowable number of error bits among a plurality of values.

5. An error allowing pattern matching circuit as claimed in claim 1, wherein said information storage means outputs error bit numbers for a plurality of different particular patterns to be detected in response to a single address signal, and said setting circuit and said comparison circuit are each provided with a plural number corresponding to the error bit numbers for the plurality of different particular patterns to be detected.

* * * * *